United States Patent [19]
Worrell

[11] Patent Number: 5,931,941
[45] Date of Patent: *Aug. 3, 1999

[54] INTERFACE FOR A MODULARIZED COMPUTATIONAL UNIT TO A CPU

[75] Inventor: Frank Worrell, San Jose, Calif.

[73] Assignee: LSI Logic Corporation, Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/430,681

[22] Filed: Apr. 28, 1995

[51] Int. Cl.⁶ .............................. G06F 9/28; G06F 9/30; G06F 9/38

[52] U.S. Cl. .................... 712/212; 712/200; 712/206; 712/209; 712/210

[58] Field of Search ........................... 395/375, 800, 395/290, 390–391, 382, 384–389, 376, 561–562; 364/200, 228–232, 736, 240; 712/200, 206, 208–215, 220–221

[56] References Cited

U.S. PATENT DOCUMENTS

| | | | |
|---|---|---|---|
| 4,297,743 | 10/1981 | Appell et al. | 395/675 |
| 4,949,241 | 8/1990 | Iwasaki et al. | 710/110 |
| 5,051,940 | 9/1991 | Vassiliadis et al. | 706/524 |
| 5,163,133 | 11/1992 | Morgan et al. | 395/800.21 |
| 5,355,460 | 10/1994 | Eickemeyer et al. | 395/391 |
| 5,381,531 | 1/1995 | Hanawa et al. | 395/582 |
| 5,394,558 | 2/1995 | Arakawa et al. | 395/387 |
| 5,430,850 | 7/1995 | Papadopoulos et al. | 395/683 |
| 5,475,824 | 12/1995 | Grochowski et al. | 395/382 |
| 5,630,083 | 5/1997 | Carbine et al. | 395/388 |

*Primary Examiner*—Zarni Maung
*Assistant Examiner*—Bharat Barot

[57] ABSTRACT

A way of designing CPU's and computational units in an integrated circuit so that the computational unit can be designed and connected to the CPU in a modular manner. The computational unit designed for one application can be redesigned for another application without requiring a change in the CPU. The CPU has an instruction register, a first decoder connected to the instruction register to decode instruction words within a predefined set of instructions, an ALU, and buses which move operand data into the ALU and results data from the ALU. The ALU operates and the buses function responsive to the first decoder. The computational unit has an execution unit connected in parallel with the ALU to the buses, and a second decoder connected to the instruction register. The second decoder decodes only a predetermined portion of an instruction word in the instruction register when the instruction word is not in the predefined set of instructions. The execution unit operates responsive to the second decoder.

17 Claims, 2 Drawing Sheets

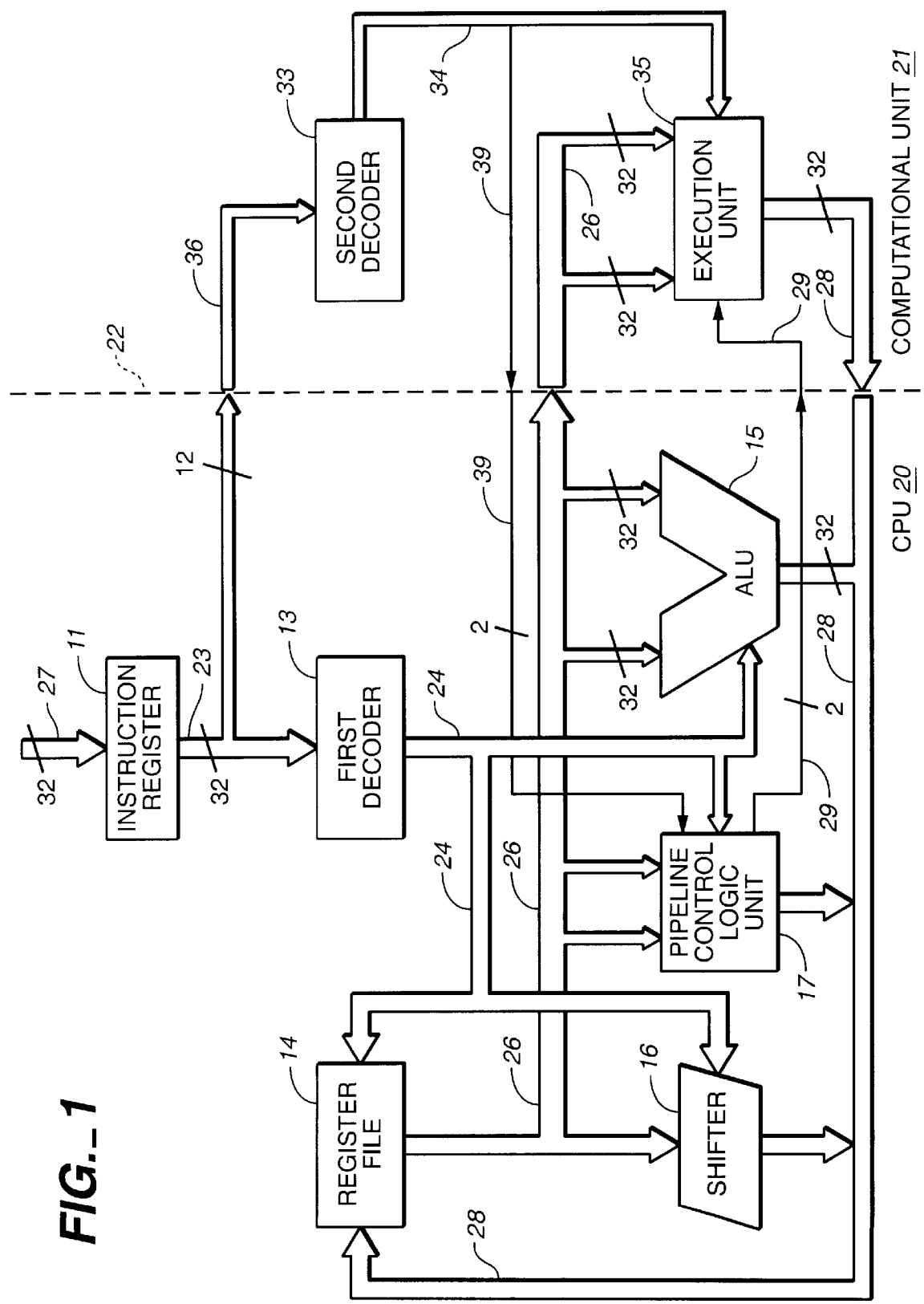
FIG._1

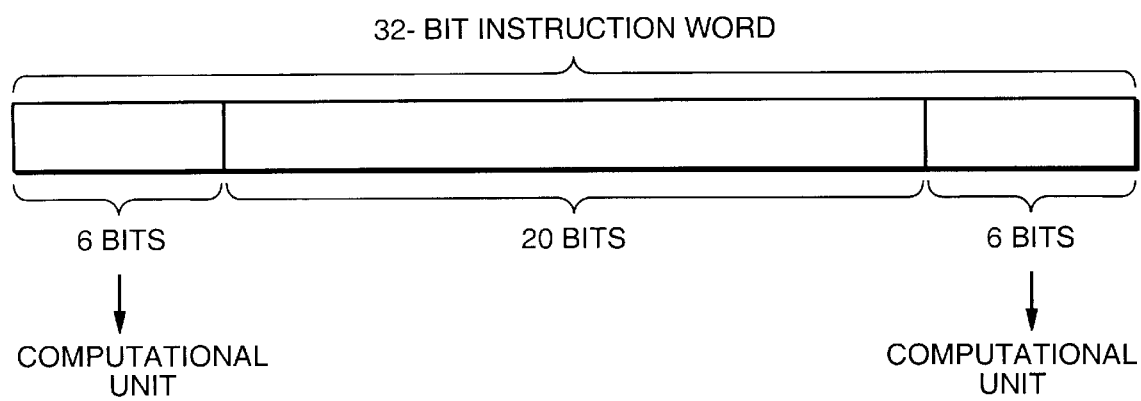
FIG._2
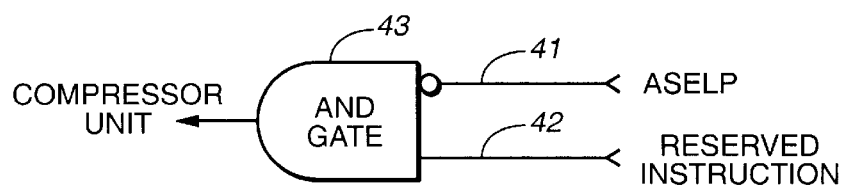
FIG._3

5,931,941

INTERFACE FOR A MODULARIZED COMPUTATIONAL UNIT TO A CPU

BACKGROUND OF THE INVENTION

The present invention is related to the field of microprocessor design and, more particularly, to the design of microprocessor CPUs and computational units which cooperatively operate with the CPUs.

In many microprocessors a computational unit is often added to perform some specialized function or functions in hardware. The alternative is to program the CPU to perform the function. However, the programmed CPU invariably takes more time to perform these tasks than the computational unit which is specifically designed to perform the function. In the meantime the programmed CPU is prevented from performing other functions. A typical example of a computational unit in current microprocessors is the floating point unit.

As a matter of principle, it is better to design the units of a system in a modular fashion so that each unit of the system can be changed or replaced without requiring drastic changes to other units of the system. For microprocessors, modularity in design has been difficult because, of necessity, the computational unit is tightly coupled to the CPU.

The present invention solves this problem so that a computational unit may be designed in a modular fashion, yet remain tightly coupled to the CPU so that performance of the computational unit is not degraded. This is especially useful in ASICs (Application Specific Integrated Circuits). A computational unit may be designed for a first application and another computational unit designed for second application without requiring a change in the CPU. Computational units may be "bolted on" the interface to the CPU as needed by the user of the integrated circuit.

SUMMARY OF THE INVENTION

To accomplish these ends, the present invention provides for an integrated circuit comprising a CPU and a computational unit. The CPU has an instruction register for receiving and holding instruction words, a first decoder connected to the instruction register to decode instruction words within a predefined set of instructions, an ALU, and buses which move operand data into the ALU and results data from the ALU. The ALU operates and the buses function responsive to the first decoder.

The computational unit has an execution unit connected in parallel with the ALU to the buses, and a second decoder connected to the instruction register. The second decoder decodes only a predetermined portion of an instruction word in the instruction register when the instruction word is not in the predefined set of instructions. The execution unit operates responsive to the second decoder. The computational unit can be designed and connected to the CPU in a modular manner. No change is required to the instruction set of the CPU; rather, only additional instructions are created for the computational unit. Coupling between the CPU and computational unit remains tight because data to and from the execution unit of the computational unit is in parallel with the ALU of the CPU, and instructions are sent directly to the second decoder of computational unit.

The present invention also provides for an interface between a CPU and a computational unit cooperatively operating with the CPU in an integrated circuit. The CPU operates with a predefined set of instructions. The interface has a data operand bus to carry operand data from the CPU unit to the computational unit and a data results bus to carry results data from the computational unit to the CPU. The interface also has an instruction bus to carry at least part of an instruction word in an instruction register in the CPU to the computational unit. The computational unit is responsive to a predetermined portion of the instruction word when the instruction word is not in the predefined set of instructions. The interface also has a first control line from the computational unit to the CPU for carrying a first control signal indicative that the computational unit is responding to the predetermined portion of the instruction word not within the predefined set of instructions.

BRIEF DESCRIPTION OF THE DRAWINGS

FIG. 1 is a block diagram of a CPU and computational unit which is tightly coupled to the CPU according to the present invention; and FIG. 2 is a diagram of an instruction word for the CPU and the bits in the instruction word which are sent to the computational unit from the instruction register in FIG. 1.

FIG. 3 is a detail of a logic gate which logically combines control signals of the CPU and the computational unit in FIG. 1.

DETAILED DESCRIPTION OF PREFERRED EMBODIMENTS

FIG. 1 illustrates a CPU 20 and a tightly coupled computational unit 21, according to the present invention. A dotted line 22 represents the interface between the CPU 20 and the computational unit 21.

The CPU 20 has an instruction register 11, a decoder 13, an ALU 15, a pipeline control logic unit 17, a shifter 16 and a register file 14. The instruction register 11 receives instruction words from an instruction memory (not shown) through a 32-bit instruction bus 27. The bits of the instruction word are held in the register 11 as input signals along a bus 23 to the input terminals of the instruction decoder 13. Responsive to the instruction word, the decoder 13 issues control signals to the ALU 15, pipeline control logic unit 17, register file 14 and shifter 16. The path of the control signals from the decoder 13 is represented by a bus 24.

The ALU 15 receives operand data from the register file 14 over a bus 26, which simultaneously supplies the ALU 15 with two 32-bit words. As shown, the bus 26 is also connected to the pipeline control logic unit 17 and the shifter 16. The results from the ALU 15 are placed on a 32-bit bus 28, which is also connected to the pipeline control logic unit 17, shifter 16 and register file 14.

Responsive to the control signals, data can be stored into and loaded from the register file 14. The ALU 15 performs pipelined arithmetic and logic operations on the input data from the bus 26 and the results are placed on the bus 28. The shifter 16 and the pipeline control logic unit 17 are connected to the buses 26 and 28 in parallel with the ALU 15. The shifter 16, as its name implies, moves the positions of the input data bits in response to control signals from the decoder 13. The pipeline control logic 17 performs various arithmetic and logic functions not handled by the ALU 15. All these units and operations are well-known to microprocessor designers.

All microprocessors are designed to respond to a specific set of instructions. For example, the CPU 20 of FIG. 1 is responsive to MIPS-1 and MIPS-2 instruction sets. If the instruction register of a microprocessor receives an instruction word which is not in the prescribed set of instructions, a NO-OP signal is generated and the CPU of the microprocessor simply skips (no operation) the instruction word. Alternatively, other microprocessors are designed for a more elaborate response so that the operation of the CPU is not adversely affected.

The present microprocessor is of such a design. When a instruction word not in the specified instruction set appears in the instruction register 11, an "Reserved Instruction" condition is created. The decoder 13 generates a Reserved Instruction control signal, which starts the operation of the pipeline control logic unit 17 to anull different stages of the pipeline of the CPU 20 and handle an exceptional condition. Typical handling of an exceptional condition involves saving appropriate information in exception handling registers and loading a new address into the program counter.

The computational unit 21 has a decoder 33 and an execution unit 35. The decoder 33 is connected in parallel with the decoder 13 in the CPU 20 and receives some of the instructions bits from the instruction register 11 as input signals over a bus 36. As shown, the decoder 33 receives 12 bits, the first 6 and the last 6, of the instruction word. From these instruction bits, the decoder 33 generates control signals, represented by a control signal bus 34, to the execution unit 35.

The execution unit 35 is connected in parallel with the ALU 15, the pipeline control logic 17 and the shifter 16 to the buses 26 and 28. The execution unit 35 receives data in two 32-bit input words from the bus 26 and transmits the data results in one 32-bit word to the bus 28.

Operationally, the decoder 33 is designed to respond to instruction words which are not the specified instruction set of the CPU 20. Stated differently, the combinations of logic 1's and 0's in the 12 bits which are the instruction words to the decoder 33 (and computational unit 21) define 32 bit instruction words which are not in the specified instruction set of the CPU 20.

FIG. 2 illustrates a 32-bit instruction word for the CPU 20 with the two 6-bit fields which are also sent to the computational unit 21. The number of fields, the arrangement of the two fields and the number of bits in each field are consistent with the MIPS-1 and MIPS-2 instruction sets. Other instruction sets may require different field(s) in the instruction word to implement the present invention.

As stated previously, the decoder 13 of the CPU 20 recognizes an instruction word which is not in its specified set of instructions and generates a reserved instruction control signal. FIG. 3 illustrates a detail of one of the two control signals which are generated in the computational unit 21 for the CPU 20 and represented by a 2-bit bus 39. Though the bus 39 is shown as entering the pipeline control logic 17 in FIG. 1, a more precise description is shown in FIG. 3. An ASELP control line 41 in the bus 39 is connected to the inverted input terminal of an AND gate 43. A RESERVED INSTRUCTION control line 42 in the control bus 24 from the decoder 13 is connected to a second input terminal of the AND gate 43. The output terminal of the AND gate 43 is connected to a control signal input terminal of the pipeline control logic unit 17.

The ASELP control line 41 goes high when the decoder 33 recognizes its 12 input bits as an instruction to the computational unit 21. The RESERVED INSTRUCTION control line 42 goes high when the decoder 13 does not recognize the 32-bit instruction word in the register 11. Thus unless the decoder 33 recognizes an instruction to the computational unit 21, a Reserved Instruction signal is received by the pipeline control logic unit 17 to start the operation to handle an exceptional condition. An active ASELP control signal prevents this and the CPU 20 continues its operations.

Additional control signals are passed between the CPU 20 and the computational unit 21. The other control line in the control bus 39 carries an ASTALLP control signal which is active high whenever the computational unit 21 requires additional time to complete its operations. This allows the computational unit 21 to remain synchronized with the CPU 20. The CPU 20 also generates control signals for the computational unit 21 as represented by the control bus 29. One control line in the bus 29 carries a KILLX control signal, active high, which is asserted by the CPU 20 to annul operations in the execution stage of the execution unit 35 of the computational unit 21. This signal is also used by the pipeline control logic unit 17 to annul operations in the execution stage of the ALU 15. The second control line in the bus 29 carries a GSTALLN control signal, active low, which is indicative of stalled operations in the pipeline operations of the CPU 20. The control signal stalls operations in the computational unit 21 for maintaining synchronization between the CPU 20 and the computational unit 21.

With the described arrangement and interface between the CPU 20 and computational unit 21, the design of the computational unit is modularized from the design of the CPU 20, yet the computational unit 21 remains tightly coupled to the CPU 20. As contemplated, the execution unit 35 is a multiply/divide unit circuit, which relieves the CPU 20 from time-consuming tasks. Depending upon the particular application of the integrated circuit, other circuits for complex functions can be designed for the computational unit 21. Examples include high-speed multiply circuits, specialized point circuits, and prioritization circuits for counting leading 1's or 0's, which are useful in many applications.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. An integrated circuit comprising:

a CPU having an instruction register for receiving and holding instruction words, said instruction words formed by combinations of logic 1's and logic 0's, a first decoder connected to said instruction register for decoding a predefined set of instruction words, an ALU, and buses for moving operand data into said ALU and results data from said ALU, responsive to said first decoder;

a computational unit having an execution unit connected in parallel with said ALU to said buses, a second decoder connected to said instruction register for decoding only a predetermined portion of an instruction word in said instruction register when said predetermined portion of said instruction word comprises combinations of logic 1's and 0's defining an instruction word not in said predefined set of instruction words; said execution unit operating responsive to said second decoder;

wherein said computational unit can be designed and connected to said CPU in a modular manner;

said second decoder is configured not to decode any entire instruction word that is in said predefined set of instruction words; and said predetermined portion of an instruction word has a fewer number of bits than the number of bits in said instruction word.

2. The integrated circuit of claim 1 wherein said data buses comprise two input data buses for moving operand data into said ALU and said computational unit, and one output bus for moving results data from said ALU and said computational unit.

3. The integrated circuit of claim 1 wherein said first decoder generates a first control signal indicative that an instruction word in said instruction register is not within said predefined set of instructions, and second decoder generates a second control signal for said CPU indicative that said computational unit is responding to said predetermined portion of said instruction word not within a predefined set of instructions.

4. The integrated circuit of claim 3 wherein a logic combination of said first and second control signals so that said second control signal negates said first control signal.

5. The integrated circuit of claim 1 wherein said predetermined portion of said instruction word comprises two sets of bits from said instruction register, a first set at the beginning of said instruction word and a second set at the end of said instruction word.

6. The integrated circuit of claim 5 wherein said instruction word comprises 32 bits, and said first set comprises 6 bits and said second set comprises 6 bits.

7. The integrated circuit of claim 1 wherein said computational unit comprises a multiply/divide arithmetic unit.

8. The integrated circuit of claim 1 wherein said second decoder is connected in parallel with said first decoder.

9. An interface between a CPU and a computational unit cooperatively operating with said CPU in an integrated circuit, said CPU operating with a predefined set of instructions, said instructions formed by combinations of logic 1's and logic 0's, said interface comprising:

a data operand bus for moving operand data from said CPU unit to said computational unit and for moving results data from said computational unit to said CPU unit;

an instruction bus to said computational unit for an instruction word in an instruction register in said CPU, said computational unit responsive to said predetermined portion when said predetermined portion of said instruction comprises combinations of logic 1's and 0's defining an instruction not in said predefined set of instructions;

a first control line from said computational unit to said CPU for carrying a first control signal indicative that said computational unit is responding to said predetermined portion of said instruction word not within a predefined set of instructions;

wherein the design and operation of said computational unit is modularized from that of said CPU;

said computational unit is configured not be responsive to any entire instruction word that is in said predefined set of instruction words; and said predetermined portion of an instruction word has a fewer number of bits than the number of bits in said instruction word.

10. The interface of claim 9 wherein said data operand bus comprises three sets of bus lines.

11. The interface of claim 10 wherein each set of bus lines comprises 32 bus lines.

12. The interface of claim 9 wherein said instruction bus carries only a predetermined portion of said instruction word.

13. The interface of claim 12 wherein said predetermined portion comprises a beginning part and an end part of said instruction word.

14. The interface of claim 13 wherein said beginning part comprises 6 bits and said end part comprises 6 bits.

15. The interface of claim 9 further comprising a second control line from said computational unit to said CPU for carrying a second control signal indicative that operations of said CPU should be stalled for maintaining synchronization between said CPU and said computational unit.

16. The interface of claim 9 further comprising a third control line from said CPU to said computational unit for carrying a third control signal indicative that operations in said computational unit should be annulled.

17. The interface of claim 9 further comprising a fourth control line from said CPU to said computational unit for carrying a control signal indicative that operations of said computational unit should be stalled for maintaining synchronization between said CPU and said computational unit.

* * * * *